(12) United States Patent
Washam et al.

(10) Patent No.: US 7,724,651 B2
(45) Date of Patent: May 25, 2010

(54) REDUNDANT FAR-END PSEUDO-WIRE CONNECTIVITY

(75) Inventors: Benjamin Washam, Ottawa (CA); Satyam Sinha, Mountain View, CA (US); Bassem M. Abdouni, Mountain View, CA (US); Praveen Muley, Mountain View, CA (US); Tiberiu Grigoriu, Ottawa (CA); Stephen Tan, San Jose, CA (US); Boovaraghavan Ranganathan, Mountain View, CA (US)

(73) Assignee: Alcatel Lucent, Paris (FR)

( * ) Notice: Subject to any disclaimer, the term of this patent is extended or adjusted under 35 U.S.C. 154(b) by 477 days.

(21) Appl. No.: 11/712,592

(22) Filed: Feb. 27, 2007

(65) Prior Publication Data

US 2008/0181233 A1      Jul. 31, 2008

Related U.S. Application Data

(60) Provisional application No. 60/898,780, filed on Jan. 31, 2007.

(51) Int. Cl.
*H04J 1/16* (2006.01)

(52) U.S. Cl. ...................................... 370/217; 370/225

(58) Field of Classification Search ................. 370/217, 370/225
See application file for complete search history.

(56) References Cited

U.S. PATENT DOCUMENTS

| 6,570,881 | B1 * | 5/2003 | Wils et al. ..................... 370/410 |
| 7,061,858 | B1 * | 6/2006 | Di Benedetto et al. ....... 370/219 |
| 7,443,847 | B1 * | 10/2008 | Albert et al. ................. 370/389 |
| 2003/0061533 | A1 | 3/2003 | Perloff et al. |
| 2006/0031482 | A1 * | 2/2006 | Mohan et al. ................ 709/224 |
| 2006/0047851 | A1 | 3/2006 | Voit et al. |
| 2007/0147233 | A1 * | 6/2007 | Asveren ....................... 370/220 |
| 2007/0253328 | A1 * | 11/2007 | Harper et al. ................ 370/219 |
| 2008/0285442 | A1 * | 11/2008 | Bruckman et al. ........... 370/225 |
| 2009/0059803 | A1 * | 3/2009 | Phaltankar ................... 370/244 |
| 2009/0094362 | A1 * | 4/2009 | Huff ............................ 709/224 |

FOREIGN PATENT DOCUMENTS

WO        WO 00/05866 A     2/2003

* cited by examiner

*Primary Examiner*—Andrew Lee
(74) *Attorney, Agent, or Firm*—Van Pelt + Yi, LLP

(57) ABSTRACT

Providing a network service is disclosed. A data associated with the service is received. It is determined whether a local context associated with the service is in an active state with respect to the service. The data is redirected to another chassis, via an inter-chassis backup connection, if it is determined that the local context is not in an active state with respect to the service.

22 Claims, 7 Drawing Sheets

REDUNDANT FAR-END PSEUDO-WIRE CONNECTIVITY

CROSS REFERENCE TO OTHER APPLICATIONS

This application claims priority to U.S. Provisional Patent Application No. 60/898,780 entitled REDUNDANT FAR-END PSEUDO-WIRE CONNECTIVITY, filed Jan. 31, 2007 which is incorporated herein by reference for all purposes.

BACKGROUND OF THE INVENTION

A subscriber host may be reachable across a provider network via two or more pseudowires or other connections or paths. A pseudowire may be used to transport Ethernet frames, or other layer two data, via a layer three network, such as an IP network. Pseudowires have been used, for example, to transport Ethernet frame across a provider network, e.g., between provider edge routers, to provide services such as virtual leased line (VLL) and virtual private network (VPN) services. In some contexts, a subscriber host, or a group of hosts, may be served by a DSLAM or other access node that has access to a core provider network via two or more separate provider edge switches/routers, each of which may be reached by an endpoint at a far end of the core provider network by a different pseudowire or other connection. In some embodiments, the pseudowires may be associated with a particular service, subscriber, or other context with which the subscriber host is associated.

In such a configuration, it may be desirable to ensure that traffic associated with the subscriber host and/or the service or other context with which it is associated, pass through a designated one of a plurality of switches/routers (or other chassis) via which the subscriber host has connectivity to the core provider network, for example to facilitate accounting and other recordkeeping and/or to enforce policies such as service level agreements, quality of service commitments, etc. In addition, it is desirable that traffic not be lost or delayed unduly in the event of a link failure and/or switchover to a standby state, as could occur if a switch/router simply stopped forwarding, accepting, and/or receiving traffic associated with a service or other context with respect to which it has entered a standby state and/or with respect to which it has suffered a link or other failure.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing and/or using an inter-chassis backup (ICB) connection to redirect to a peer traffic from a chassis that is in a standby state and/or has experienced a failure with respect to a service or other context with which the traffic is associated is disclosed. In some embodiments, the ICB path comprises a pseudowire or other connection between two edge switches/routers. In some embodiments, a separate ICB is provided for each service or other context, such as a service access point (SAP) and/or virtual leased line (VLL) context. Traffic arriving from the core network at a standby edge switch/router is sent via a corresponding ICB to the active switch/router, instead of out the downstream port on the standby that the standby otherwise would have used to reach the downstream host if it were active. Likewise, if a pseudowire associated with a SAP/VLL at the active switch/router were unavailable, traffic to a far end destination reachable via a different pseudowire that connects a standby chassis to the far end destination is sent from the active switch/router to the standby via an ICB associated with the SAP/VLL, and the standby forwards it to the far end via the surviving pseudowire.

Figure 1:
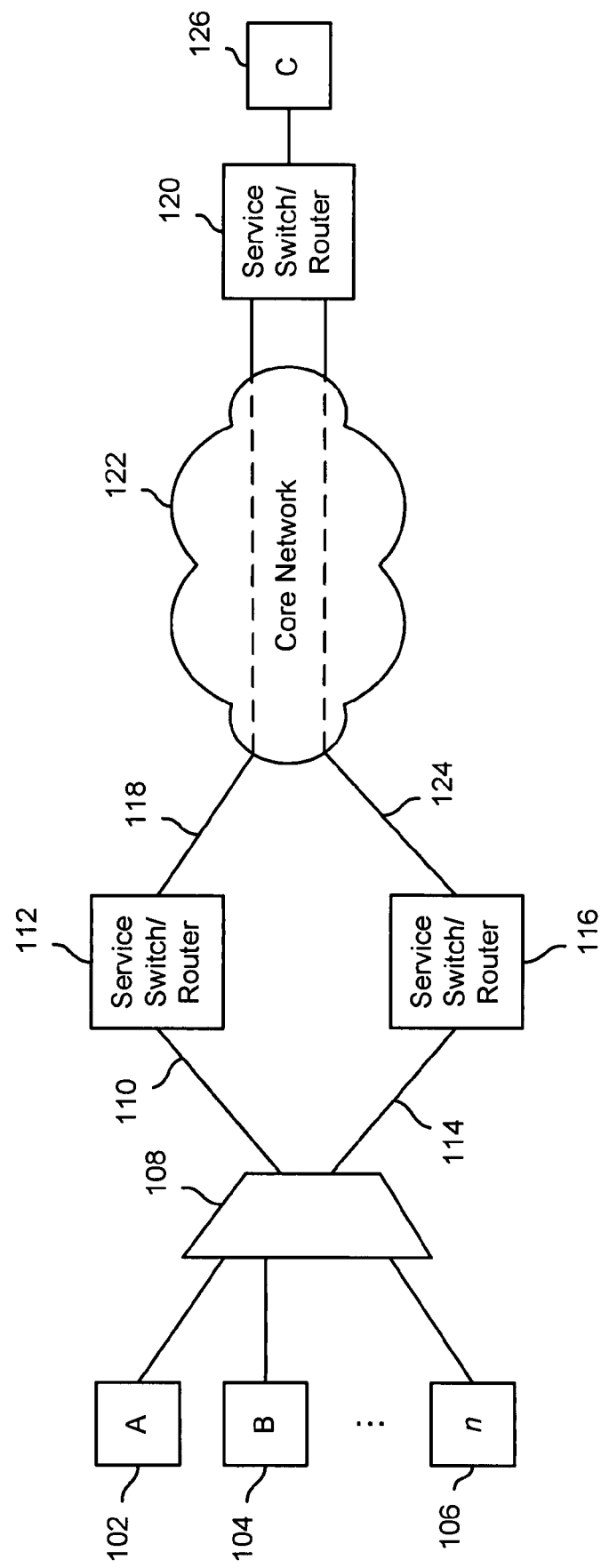
FIG. 1 is a block diagram illustrating an embodiment of a network access configuration in which one or more subscriber hosts have network connectivity via multiple edge switches/routers.

FIG. 1 is a block diagram illustrating an embodiment of a network access configuration in which one or more subscriber hosts have network connectivity via multiple edge switches/routers. A plurality of subscriber hosts A through n, represented in FIG. 1 by hosts 102, 104, and 106, have access via a digital subscriber line access multiplexer (DSLAM) 108 to a network service provider's core network 122. In the example shown, the DSLAM 108 is connected to the provider network 122 via a first connection (or set of connections) 110 to a first switch/router 112 and via a second connection (or set of connections) 118 to a second switch/router 116, e.g., for redundancy. Switch/router 112 has connectivity to a far end provider edge device 120 via a first pseudowire 118 and switch/router 116 has connectivity to edge device 120 via a second pseudowire 124. In some embodiments, each of pseudowires 118 and 124 is associated with a subscriber and/or service context, such as a service access point, virtual leased line, or other context associated with transporting traffic between the subscriber hosts A through n (102-106) and a host 126 accessible via the edge device 120 at the far end of pseudowires 118 and 124.

In some embodiments, one or the other of service switches/routers 112 and 116 may be designated and/or configured to operate in an active state or mode, and the other in a standby state or mode, with respect to a particular subscriber and/or service (e.g., high speed internet, VoIP, streaming media, etc.) with which pseudowires 118 and 124 are associated. Examples of reasons for configuring one chassis to operate in an active mode and the other in a standby mode include facilitating auditing, accounting, and/or other operations or transactions that require traffic to be visible to one node or the other and enforcing service level agreement, quality of service, and/or other policies and/or obligations with respect to traffic associated with a particular subscriber and/or service.

Some network services may require that Ethernet frames or other data be transported to a destination at a far end of the provider network 122, e.g., to the service switch/router 120 and/or a far end subscriber host 126 associated therewith. Since the host 126 is reachable by DSLAM 108 via either switch/router 112 or switch/router 116, it may be necessary (e.g., in the event of a failure of pseudowire 118 or pseudowire 124) and/or desirable (e.g., to facilitate accounting and/or policy enforcement) to have all traffic being sent between hosts 102, 104, and 106 on the one hand and host 126 on the other, e.g., all traffic associated with a service requiring that data be transported between them, via one or the other of switches/routers 112 and 116. Using an inter-chassis backup connection to redirect traffic to an active one of a plurality of chassis is disclosed.

Figure 2A:
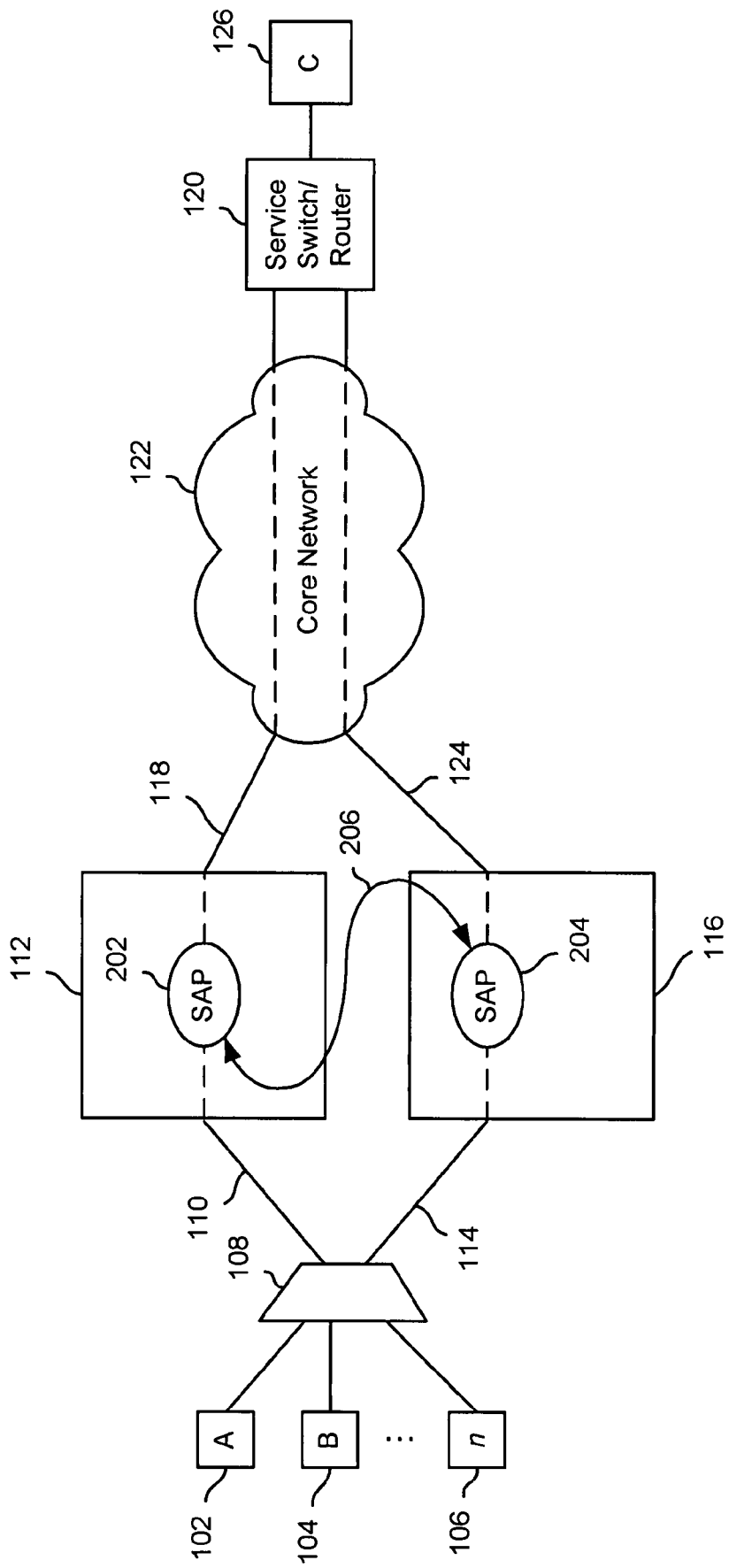
FIG. 2A is a block diagram illustrating an embodiment of a system comprising an inter-chassis backup connection.

FIG. 2A is a block diagram illustrating an embodiment of a system comprising an inter-chassis backup connection. In the example shown, an inter-chassis backup (ICB) connection 206 has been provided between switch/router 112 and switch/router 116. In some embodiments, ICB 206 comprises a pseudowire, similar to pseudowires 118 and 124. In the example shown, pseudowires 118 and 124 are associated with a service context represented in FIG. 2A by service access points (SAP) 202 and 204, respectively. When switch/router 112 is in an active state with respect to a subscriber and/or service with which SAP 202 is associated, traffic arriving at switch/router 112 via connection 110 is associated with SAP 202 and sent via pseudowire 118 to switch/router 120. Likewise, when switch/router 116 is active traffic arriving at switch/router 116 via connection 114 is associated with SAP 204 and sent via pseudowire 124 to switch/router 120. Traffic arriving at switch/router 112 via pseudowire 118 at a time when switch/router 112 is active is associated at switch/router 112 with SAP 202 and forwarded to DSLAM 108 via link 110. Likewise, when switch/router 116 is active traffic arriving via pseudowire 124 is associated at switch/router 116 with SAP 204 and forwarded to DSLAM 108 via link 114.

In the example shown in FIG. 2A, a bidirectional ICB 206 connects a near-end interface of SAP 202 with a far-end interface of SAP 204. When switch/router 112 is in a standby state with respect to a subscriber and/or service with which SAP 202 is associated, traffic received via pseudowire 118 is associated with SAP 202, as before (i.e., when active), but instead of forwarding the traffic to DSLAM 108 via link 110 traffic received via pseudowire 118 is redirected via ICB 206 to SAP 204 on switch/router 116, which in turn forwards the traffic to DSLAM 108 via link 114. Redirecting inbound (e.g., to subscriber hosts 102-106) traffic to a single active node (switch/router 116 in the above examples) in various embodiments facilitates auditing, logging, accounting, and/or enforcement of service level agreements, quality of service obligations, etc. at a single active node. By way of further example, if switch/router 116 were the active node but experienced a failure with respect to pseudowire 124, the ICB 206 in some embodiments would be used to re-route traffic to/from the far end (i.e., switch/router 120 and associated host 126 in this example) through the active node, with all traffic being transported across the network 122 via pseudowire 118.

In some embodiments, an ICB is provided on a per-service or other context basis. In some embodiments, the ICB comprises a pseudowire and is bound to a service or other context instance in a manner similar to pseudowires used to transport traffic across the provider's network.

Figure 2B:
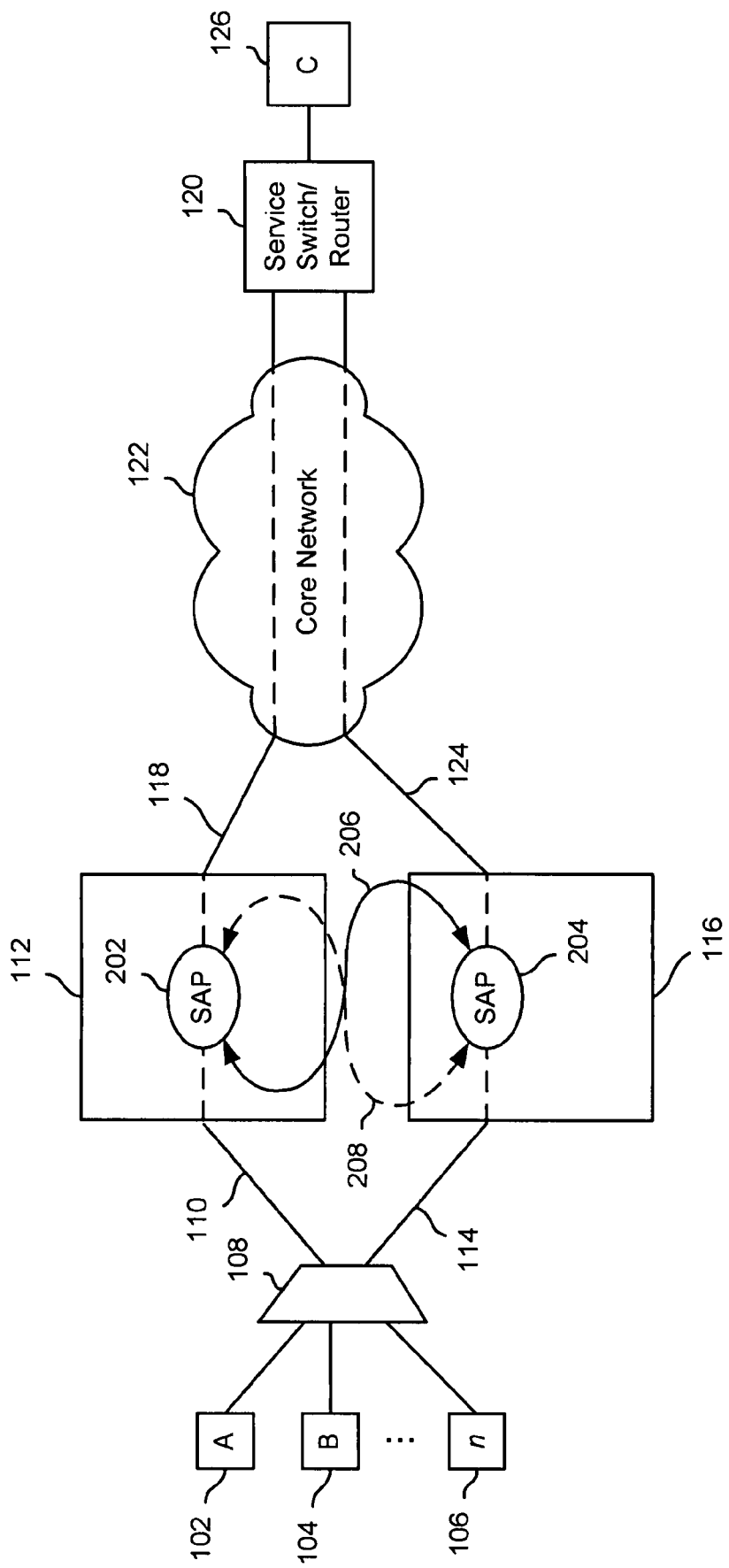
FIG. 2B is a block diagram illustrating an embodiment of a system comprising complementary inter-chassis backup connections.

FIG. 2B is a block diagram illustrating an embodiment of a system comprising complementary inter-chassis backup connections. In this example, a pair of bidirectional inter-chassis backup connections 206 and 208 is provided. Inbound traffic received via pseudowire 118 at a time when switch/router 112 is in standby and switch/router 116 is active is redirected to switch/router 116 via ICB 206. Likewise, traffic received from DSLAM 108 via link 110 is redirected from an egress interface of SAP 202 to an ingress interface of SAP 204 on switch/router 116 and forwarded via pseudowire 124. Using the foregoing approach, links 110 and 114 in some embodiments are presented to DSLAM 108 as a single logical entity (e.g., a link aggregation group, or LAG), and traffic is redirected from the standby chassis to the active chassis transparently to DSLAM 108.

In some embodiments, providing the ability of a standby chassis to continue to receive and redirect to the active chassis traffic associated with a service with respect to which the standby chassis has entered a standby mode or state after a period of being in an active state enables such a transition to a standby state to be effected more gradually and/or gracefully than would be possible without such ability to redirect traffic. For example, rather than having a chassis that enters a standby state from an active state simply begin to refuse or drop traffic associated with the service for which it has become a standby, traffic continues to be accepted and is redirected to the active chassis, e.g., for a limited time. In some embodiments the chassis that has entered or is about to enter the standby state sends a notification upstream, e.g., to nodes at the far end that have been sending traffic to it while in the active state, notifying such nodes that it has entered or is about to enter the standby state. In some embodiments, far end nodes learn gradually, e.g., as a result of beginning to receive from a newly active different chassis traffic associated with the service, that the formerly active chassis is no longer the active chassis.

Figure 3:
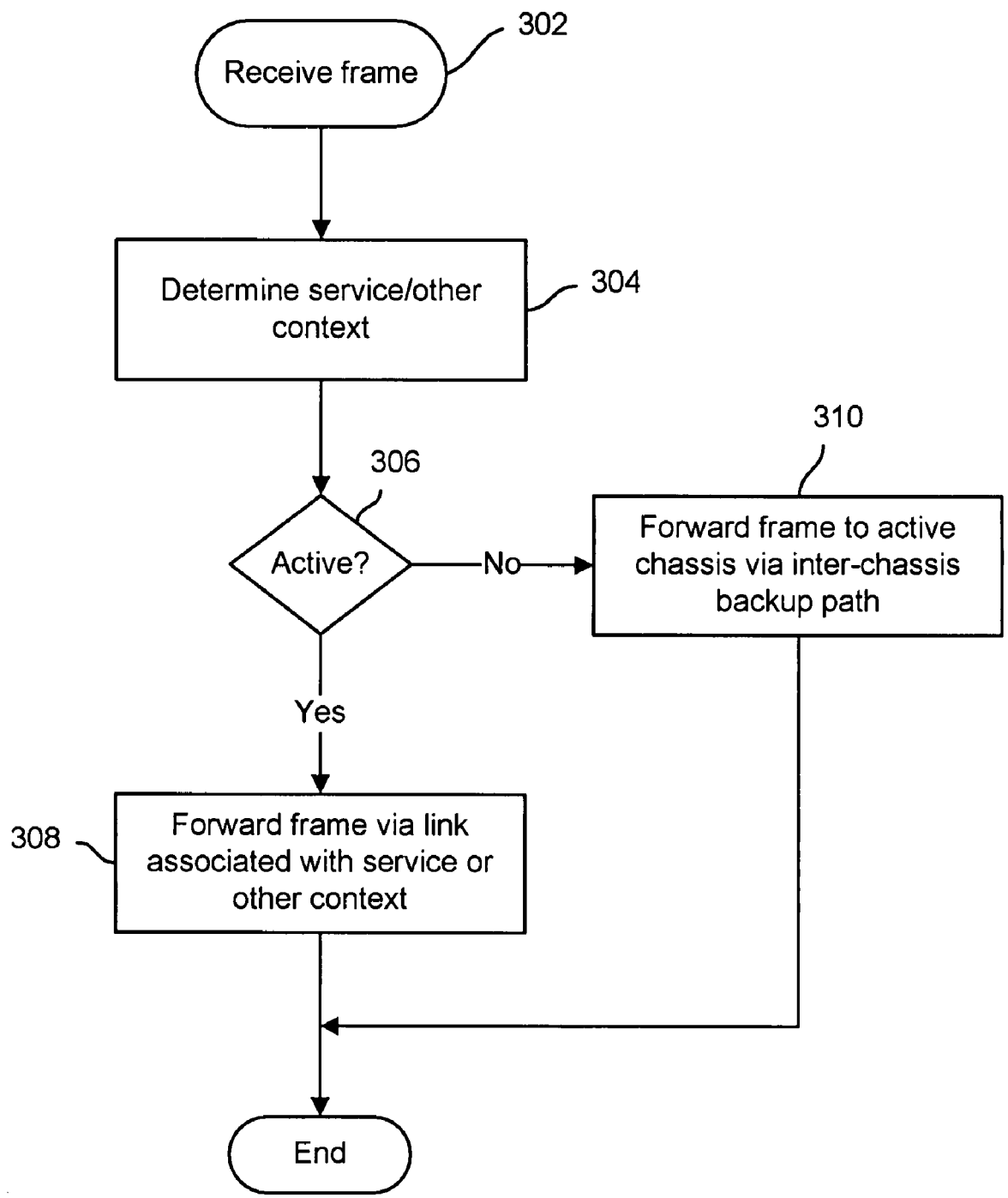
FIG. 3 is a flow chart illustrating an embodiment of a process for redirecting traffic to another chassis via an inter-chassis backup connection.

FIG. 3 is a flow chart illustrating an embodiment of a process for redirecting traffic to another chassis via an inter-chassis backup connection. A frame is received (302) and a service/other context with which it is associated is determined (304). If the local node is in an active state or mode with respect to the service or other context (306), the frame is forwarded via a link associated with the service or other context (308), e.g., link 110 in the case of traffic received via pseudowire 118, or conversely pseudowire 118 in the case of traffic received via link 110 or ICB 206 in the case of traffic received at switch/router 112 while in the active state in the examples shown in FIGS. 2A and 2B. If the local node is not active (306), the frame is forwarded to the active chassis via and associated ICB (310). For example, in the example shown in FIGS. 2A and 2B a frame received via link 114 at a time when switch/router 116 is in standby would be forwarded to switch/router 112 via ICB 206.

Figure 4:
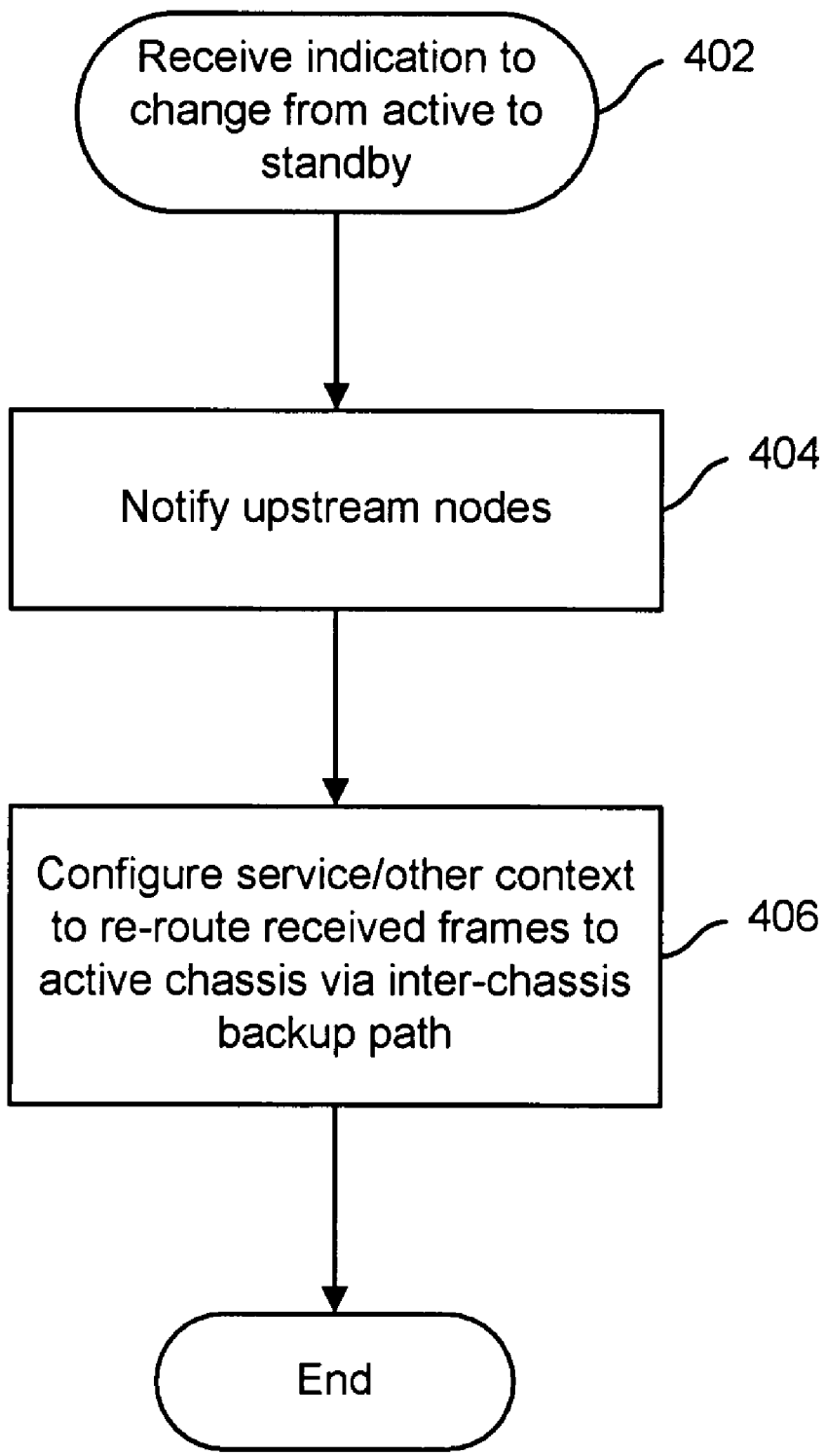
FIG. 4 is a flow chart illustrating an embodiment of a process for changing from an active state to a standby state.

FIG. 4 is a flow chart illustrating an embodiment of a process for changing from an active state to a standby state. In the example shown, an indication to change from an active state to a standby state is received (402). One or more upstream nodes are notified (404). For example, a far end subscriber host and/or edge router is notified in some embodiments that traffic associated with a service with respect to which a node implementing the process of FIG. 4 had been in an active state should no longer be sent to the node and/or should be sent instead to a specified node that has now become or is becoming active with respect to the service. In some embodiments, 404 is omitted and upstream (far end) nodes and/or processes learn other than through a notification such as described above in connection with 404 that the formerly active node is no longer active and/or that traffic associated with the service should now be sent to a different node. A service or other context with respect to which the node implementing the process of FIG. 4 had been active is configured to redirect to the new active chassis, via an inter-chassis backup connection, subsequently received frames associated with the service or other context with respect to which the node implementing the process of FIG. 4 has entered or is entering the standby state. In some embodiments, traffic is redirected for a limited (e.g., a prescribed, preconfigured, and/or user configurable) amount of time, and subsequently dropped.

Figure 5:
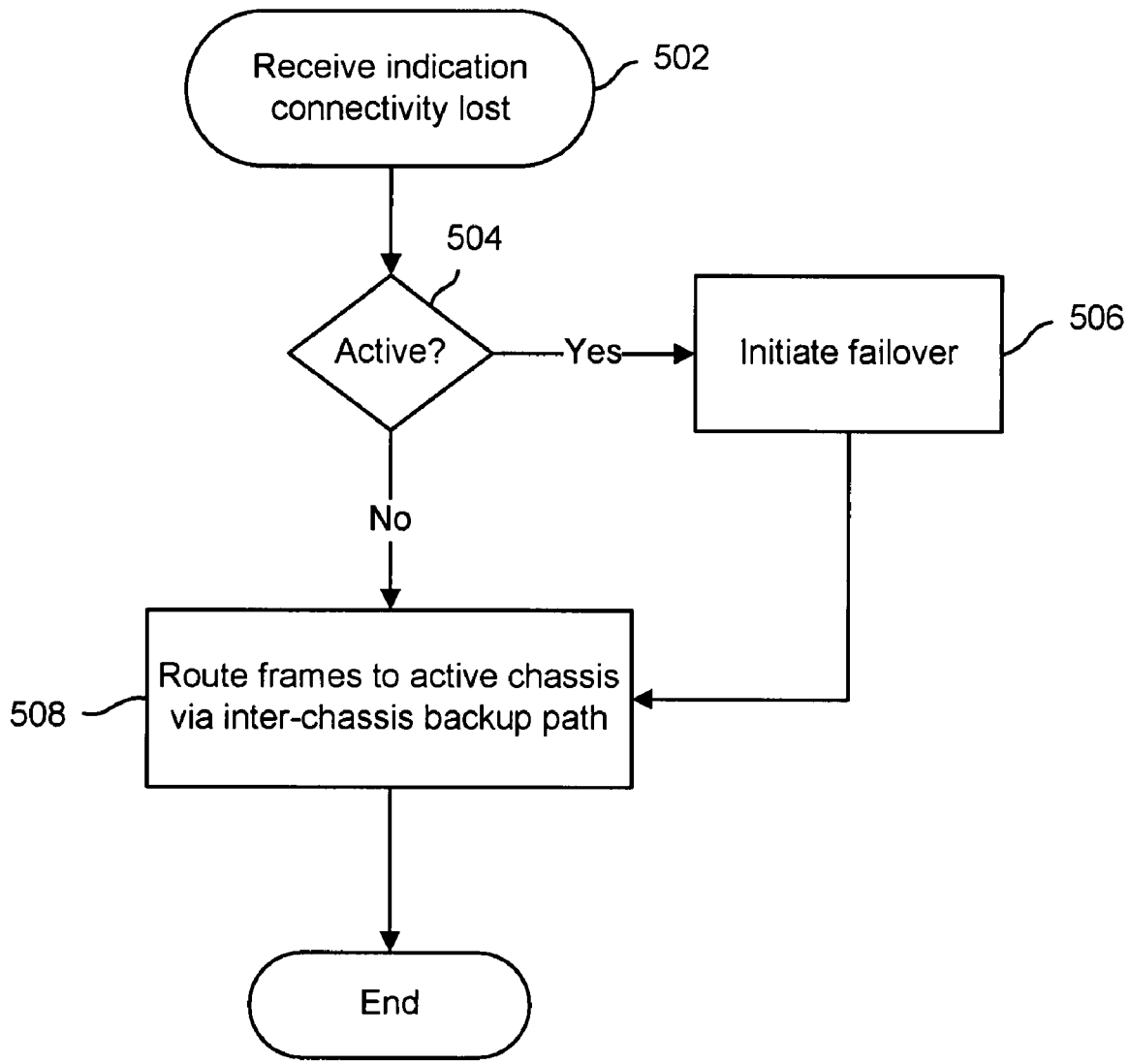
FIG. 5 is a flow chart illustrating an embodiment of a process for responding to a loss of pseudowire or other connectivity across a provider or other network.

FIG. 5 is a flow chart illustrating an embodiment of a process for responding to a loss of pseudowire or other connectivity across a provider or other network. An indication that connectivity has been lost is received (502). If the node that has lost connectivity is currently in an active state with respect to a service or other context associated with the connection with respect to which connectivity has been lost (504), a failover to a standby chassis is initiated (506) and subsequently received frames associated with the service or other context associated with the connection with respect to which connectivity has been lost are redirected, via an inter-chassis backup path, to the formerly standby chassis that has now become the active chassis (508). If the node experience the failure is in standby (504), in the example shown it continues to redirect frames to the active chassis via the inter-chassis backup path (508). In some embodiments, a standby chassis experience such a failure would notify the active chassis, and/or downstream and/or upstream nodes, that it no longer has direct connectivity to the far end due to the failure of the pseudowire. In some embodiments, a standby chassis that has lost direct connectivity to the far end may still be able to remain available as a standby and to assume active status if required, so long as indirect connectivity to the far end is available via another chassis to which it has an inter-chassis backup path for the service or other context.

Figure 6:
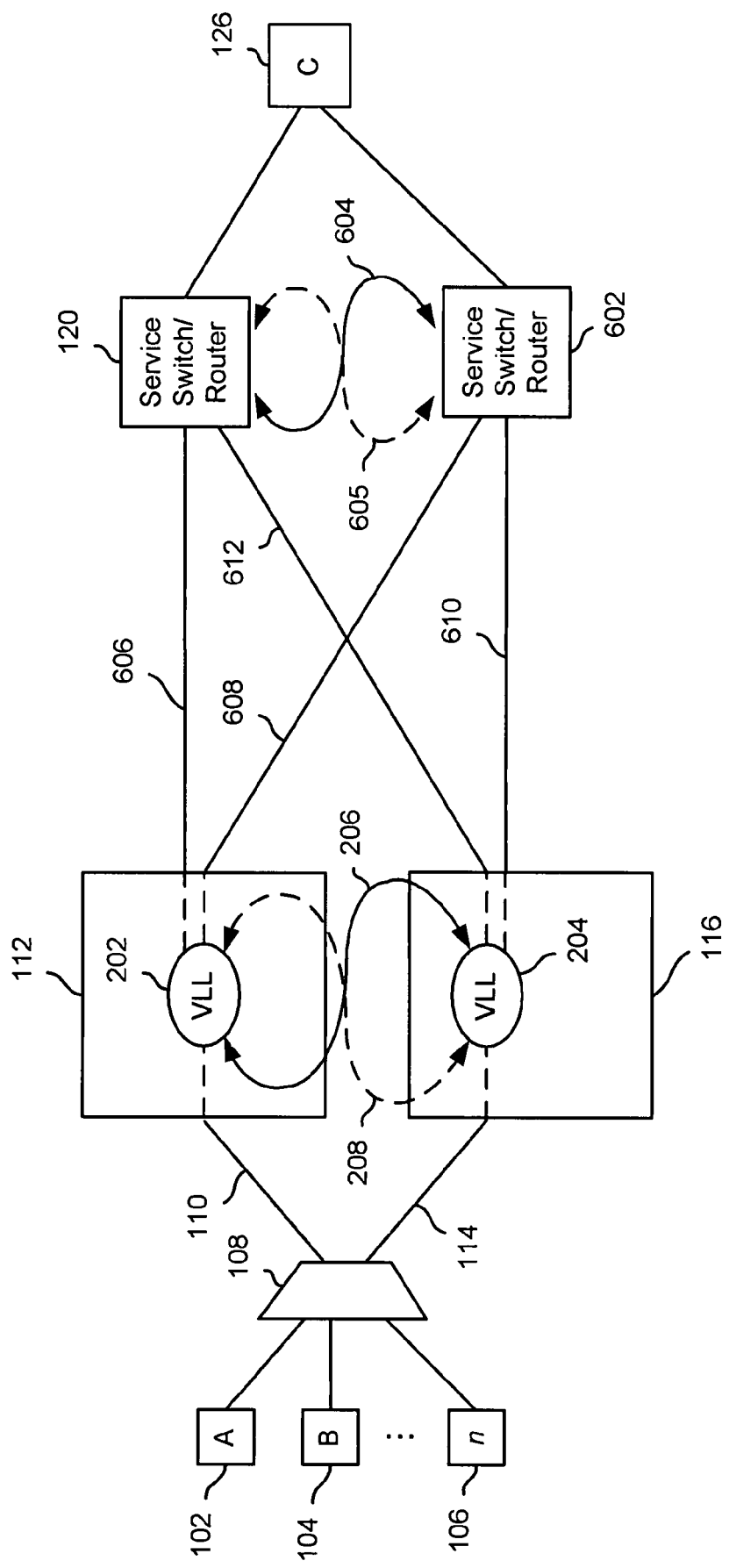
FIG. 6 is a block diagram illustrating an embodiment of a system in which inter-chassis backup connections are used to provide redundant connectivity across a provider or other network.

FIG. 6 is a block diagram illustrating an embodiment of a system in which inter-chassis backup connections are used to provide redundant connectivity across a provider or other network. In the example shown, edge switches/routers 112 and 116 on a first end of a provider network (not shown) are connected in a "full mesh" configuration by pseudowires 606, 608, 610, and 612 across the provider network to a far end pair of edge switches/routers 120 and 602. The connections are associated in the example shown with a virtual leased line (VLL) context, represented in FIG. 6 by VLL instances 202 and 204. A pair of inter-chassis backup paths 206 and 208 connects the near end chassis 112 and 116, for purposes of traffic associated with the VLL. Likewise, at the far end a pair of inter-chassis backup paths 604 and 605 connects the far end chassis 120 and 602, for purposes of traffic associated with the VLL. In some embodiments, the configuration shown in FIG. 6 enables full connectivity to be maintained, and full flexibility to be provided with respect to which ones of chassis 112 and 116 on the near end and chassis 120 and 602 on the far end are in the active state, even in the event of the failure (e.g., loss of connectivity) of one of the pseudowires 606, 608, 610, and 612. For example, in some embodiments if switch/router 112 were active on the near end and switch/router 120 active on the far end, in the event direct connectivity between the two active chassis via pseudowire 606 were lost, switches/routers 112 and 120 could remain active, with switch/router 112 being configured to redirect outbound traffic to switch/router 120 via ICB 208 and pseudowire 612 and/or switch/router 120 being configured to send traffic to switch/router 112 via ICB 604 and pseudowire 608.

In some embodiments, a PE notifies PE's at the far end of its "active" or "standby" status with respect to a service or other context, such as the VLL in FIG. 6. In some embodiments, a near end provider edge device, such as switch/router 112, indicates to far end PE's that the near end PE is in the "active" or "standby" state by using targeted LDP status bits in the pseudowire control plane. The far end PE's use such notification in some embodiments to determine which pseudowire to use to forward across the provider network traffic associated with the service or other context. For instance, in the example described above if connectivity via the pseudowire 606 connecting active PE's 112 and 120 directly were lost, such that PE 120 directed via ICB 604 traffic intended for 112 as the active PE on the far end for that context, in some embodiments the PE 602 would know to forward the traffic to PE 112 via pseudowire 608 in part due to having been notified by PE 112, as described above, that PE 112 is in the "active" state with respect to the VLL or other context. In some embodiments, a PE is configured to not forward via an ICB traffic received over an ICB, to prevent looping, e.g., in a case such as described above where the active chassis redirects to the standby chassis as an alternate way to reach a far end "active" PE to which it has lost direct connectivity.

Using techniques described herein, redundancy can be provided while ensuring that all traffic associated with a service or other context is handled by a single node configured to perform accounting or similar functions and/or to enforce a policy or obligation with respect to traffic associated with a service or other context. Also, graceful failover or switchover can be achieved by enabling and configuring a node that is changing to a standby state and/or that has experienced a loss of connectivity or other failure to redirect to an active chassis traffic associated with a service or other context with respect to which the node is in a standby state or with respect to which it has experienced a failure.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing a network service, comprising:
   receiving at a local chassis a data associated with the service;
   determining whether a local context associated with the service is in an active state with respect to the service; and
   redirecting the data to another chassis, via an inter-chassis backup connection associated with the service, in the event it is determined that the local context is not in an active state with respect to the service;
   wherein the inter-chassis backup connection and one or more other inter-chassis backup connections constitute a plurality of inter-chassis backup connections associated with the local chassis and connecting the local chassis and the another chassis;
   wherein a separate inter-chassis backup connection is provided for a separate service context associated with the local chassis.

2. A method as recited in claim 1, wherein the data is received via an interface associated with a DSLAM or other customer premises equipment.

3. A method as recited in claim 1, wherein the data is received via a pseudowire or other connection to a far end destination across a provider network.

4. A method as recited in claim 1, wherein the data is received via an interface associated with the local context.

5. A method as recited in claim 1, wherein the local context comprises one or more of the following: a service context, a subscriber context, a service access point, and a virtual leased line.

6. A method as recited in claim 1, further comprising receiving an indication that direct connectivity with a destination with which the data is associated has been lost.

7. A method as recited in claim 6, further comprising redirecting the data to the other chassis, via the inter-chassis backup connection, based at least in part on the determination that connectivity to the destination has been lost.

8. A method as recited in claim 1, further comprising receiving an indication to change from being in an active state to being in a standby state with respect to the service.

9. A method as recited in claim 8, further comprising sending to an upstream node associated with the data a notification that the local context has entered the standby state.

10. A method as recited in claim 8, further comprising continuing to accept and process data associated with the service, including by forwarding such data to the other chassis via the inter-chassis backup connection.

11. A method as recited in claim 1, wherein the inter-chassis backup connection comprises a pseudowire.

12. A method as recited in claim 1, wherein the local context comprises a context at a first provider network edge device and the other chassis comprises a second provider network edge device at a same end, with respect to the service, of a provider network with which the first and second provider network edge devices are associated.

13. A method as recited in claim 1, wherein it is determined that the local context is not in an active state with respect to the service if connectivity to a destination associated with the data has been lost.

14. A method as recited in claim 1, further comprising in the event the local context is determined to be in an active state: receiving an indication that connectivity to a destination associated with the data has been lost; and redirecting the data to the other chassis, via the inter-chassis backup connection, for further delivery to the destination.

15. A method as recited in claim 1, further comprising notifying a device at a far end of a provider network that the service is in the active state or the standby state with respect to the service.

16. A method as recited in claim 15, wherein notifying comprises using targeted LDP status bits in the pseudowire control plane.

17. A network device, comprising:
   a first communication interface configured to receive data associated with a service;
   a second communication interface comprising an inter-chassis backup connection to another chassis; and
   a processor coupled to the first and second communication interfaces and configured to determine, with respect to a data received via the first interface, whether a local context associated with the service is in an active state with respect to the service; and redirect the received data to the other chassis, via the inter-chassis backup connection associated with the service, in the event it is determined that the local context is not in an active state with respect to the service: wherein the inter-chassis backup connection and one or more other inter-chassis backup connections constitute a plurality of inter-chassis backup connections associated with the local chassis and connecting the local chassis and the another chassis: wherein a separate inter-chassis backup connection is provided for a separate service context associated with the local chassis.

18. A system as recited in claim 17, wherein the first communication interface comprises a network interface.

19. A system as recited in claim 17, wherein the first communication interface comprises a pseudowire.

20. A system as recited in claim 17, wherein the inter-chassis backup connection comprises a pseudowire.

21. A system as recited in claim 17, wherein the system comprises an edge switch or router.

22. A computer program product for providing a network service, the computer program product being embodied in a computer readable medium and comprising computer instructions for:
   receiving a data associated with the service;
   determining whether a local context associated with the service is in an active state with respect to the service; and
   redirecting the data to another chassis, via an inter-chassis backup connection associated with the service, in the event it is determined that the local context is not in an active state with respect to the service;
   wherein the inter-chassis backup connection and one or more other inter-chassis backup connections constitute a plurality of inter-chassis backup connections associated with the local chassis and connecting the local chassis and the another chassis.

* * * * *

UNITED STATES PATENT AND TRADEMARK OFFICE
CERTIFICATE OF CORRECTION

| | | |
|---|---|---|
| PATENT NO. | : 7,724,651 B2 | |
| APPLICATION NO. | : 11/712592 | |
| DATED | : May 25, 2010 | |
| INVENTOR(S) | : Washam et al. | |

It is certified that error appears in the above-identified patent and that said Letters Patent is hereby corrected as shown below:

Column 8, Claim 17, Line 27:
delete "service:" replace with --service;--
Column 8, Claim 17, Line 31:
delete "chassis:" replace with --chassis;--

Signed and Sealed this
Twenty-fifth Day of December, 2012

David J. Kappos
*Director of the United States Patent and Trademark Office*